Patented Dec. 3, 1935

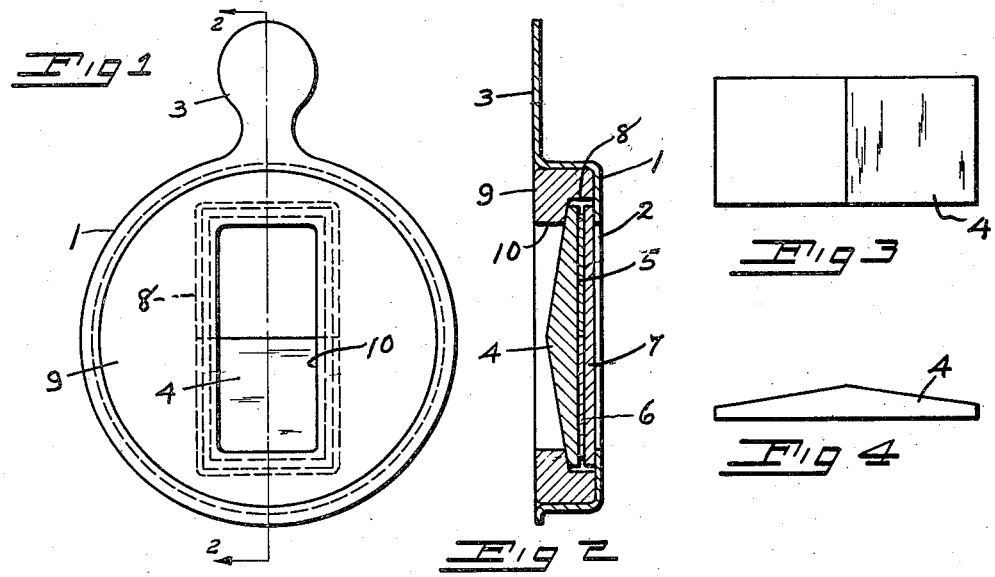
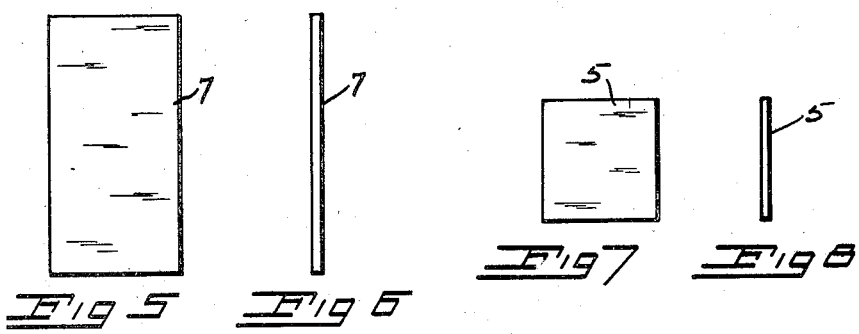
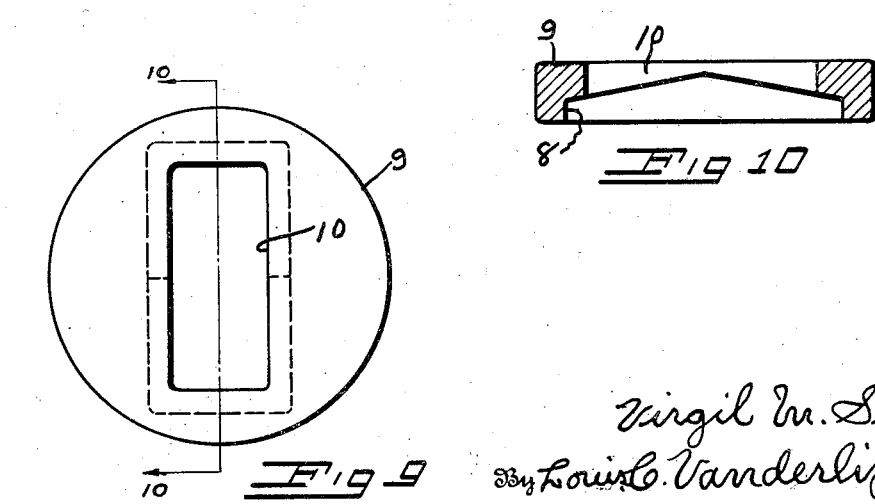

2,023,246

UNITED STATES PATENT OFFICE 2,023,246

BICHROMATIC DEVICE FOR OCULAR REFRACTION

Virgil M. Sears, Goshen, Ind.

Application July 24, 1933, Serial No. 681,947

3 Claims. (Cl. 88—20)

My invention relates to optical devices for determining defects in the human eye.

An object of the invention is to determine the optical error in the eye, or eyes, or the absence of optical error, when no astigmatism is present, or when astigmatism is present, but has been corrected previously.

A third object of the invention is to determine the astigmatic error in the eye or eyes, and the correction therefor by spherical lens or lenses.

A third object of the invention is to determine the amount or extent of presbyopia requiring optical aid and the amount or extent of such aid required.

Other and more specific objects of the invention are mentioned and described herein.

It is a well known scientific fact that no two colors of light will focus sharply at exactly the same distance from a given lens. For example, red will focus somewhat farther from the lens than green. And this fact serves as the basis for my invention.

Generally, my invention comprises a doubling prism combined with red and green filters. When placed in front of the eye it causes the patient to simultaneously see two images, one red, and the other green. For the reason stated, it is impossible for both these images to be perfectly sharp at the same time. Hence the natural tendency of the eye toward accommodation is eliminated, because, if red, for example, is brought sharply into focus, the green becomes more blurred, and vice versa. This test depends only upon the position of the color foci and is therefore of equal use in color blindness, identification being made either "right" or "left", in such a case.

It may be appreciated, therefore, that a plus lens will bring the red focal point forward of the retina, while a concave lens will bring the green into focus. The monochromatic filters used in my invention have been so designed and chosen that ordinary white light will average approximately midway between the two foci mentioned.

In the practical application of my invention it may be mounted in a trial frame, a phoropter head, or phorometer, which are well known scientific instruments relating to this art, either one of which may be efficiently used as a mount.

My invention is illustrated in the accompanying drawing, wherein

Figure 1 illustrates a plan view of the assembled unit;

Figure 2 illustrates a section taken on line 2—2 of Fig. 1;

Figure 3 illustrates a plan view of the prism alone;

Figure 4 illustrates a side elevation thereof;

Figure 5 illustrates a plan view of the protective plate for the two filter plates;

Figure 6 is a side or edge view thereof;

Figures 7 and 8 illustrate plan and side views, respectively, of one of the filter plates;

Figure 9 illustrates a top plan view of the rubber retainer element; and

Figure 10 is a section taken on line 10—10 of Fig. 9.

Similar numerals of reference indicate like parts throughout the several views on the drawing.

Referring now to the details of the drawing the numeral 1 indicates a cup-like holder element which is preferably annular and which may be desirably made of sheet metal, said holder being provided with a window 2, preferably rectangular, in the wall thereof, and a handle 3.

My invention contemplates a bi-prism 4, a pair of colored filter plates or elements 5 and 6, and a single filter protective plate 7, all of which are adapted to be mounted within the holder 1, and all made of some suitable transparent material, such as glass, or the like. Preferably, the prism 4, filter plates 5 and 6, and the protective plate 7 are rectangular in shape and all are removably arranged within a rectangular recess 8 formed in one side of the retainer member 9. And preferably, the bi-prism 4 has two flat converging prismatic faces on one side thereof and is flat on the opposite side thereof.

The retainer element 9 is preferably annular and may be made of soft resilient rubber to facilitate it mounting within the recess of the holder 1. The numeral 10 indicates a rectangular window which is formed in the rubber retainer element 9 and which is in alignment with the holder window 2, said window 10 being encompassed by the recess 8 which provides a ledge 11, extending around said window, to receive the outer edges of the prism 4. The filter plates 5 and 6, which may be made of red and green transparent material, such as glass, or the like, are preferably square and are adapted to be arranged edge to edge against the flat side of the prism 4. The rectangular transparent filter protective plate 7 is then placed over the two filter plates 5 and 6 and within the recess 8 of the retainer element 9 to complete the unit. The element 9 is then manually pressed into the shallow cup of the holder 1 which causes the protective plate to abut the holder wall around the window 2 thereof. To enable repairs and replacements of the parts of the device the retainer element 9 may be readily removed from the holder 1.

Spherical check test at twenty feet

One eye is covered and my device is then placed in a trial frame and centered before the eye under examination, the handle 3 being turned outward so that chart will appear to the right of the other as seen by the patient. The patient's attention is directed to the double images of the large test letters. The eye is fogged and then this lens is decreased, preferably 0.25 diopter steps, until the patient reports the red image to be perfectly sharp. This correction is noted and the lens is decreased further until the green is reported sharp, at which time the red will have become blurred.

The proper correction will be found exactly half way between the two, and when this is made the patient should report both images equally clear and distinct.

Distance correction

This technique does not require the use of test letters, the clock dial being used in a new manner at the twenty foot distance. The vision is fogged sufficiently to find the darker lines on the dial. Then my device is placed before the eye and rotated to produce horizontal diplopia. Attention is drawn to the lines on the two dials which were seen darker on the single dial before my device was applied. These lines will appear darker on the red dial than on the green one. The spherical lens is reduced until these lines are of equal clearness on the two dials in exactly the same manner as described for the spherical check test, and this spherical lens corrects the first principal meridian. In case of astigmatism, the lines at right angles to the above, which represent the second principal meridian, are not equalized but are plainer on the red dial. The lens is, therefore, again reduced until equalization of these lines, in their turn, is effected and checked. This second finding corrects the second principal meridian and it is left in place as the spherical correction. The difference between the two findings is the measure of the astigmatism. A plus cylinder of this value is required with the axis that of the first noted darker lines. This is the cylindrical correction.

Reading correction for presbyopia

The reading addition is determined for each eye separately. The lined card supplied with my device is held at the desired distance and placed under direct illumination of a reading lamp. Direct light is required on the card, which is the usual lined card used in optical tests, because of the high absorption of the instrument. With the invention thus arranged horizontal diplopia is produced, and attention is drawn to the two lines on the colored backgrounds. A plus lens is added to clear the line on the red, and this will blur that on the green. This lens is now decreased until the green is clear and the red is blurred; then, as before, test the correction halfway between the two. This is the required add for comfortable vision at the green distance.

I claim:

1. A device for testing the human eye comprising a holder, a resilient retaining element mounted on said holder and provided with a window, a transparent bi-prism mounted in said retaining element in registration with the window thereof, and a pair of transparent varicolored filter plates, arranged edge to edge, mounted in said retaining element and oppositely associated with the faces of said prism.

2. A device for testing the human eye comprising a holder, a resilient retaining element mounted on said holder and provided with a window, a transparent by-prism mounted in said retaining element in registration with the window thereof, and a pair of transparent varicolored filter plates mounted on said retaining element adjacent said prism, said filter plates being arranged in edge to edge relation and in registration with the two faces thereof, one of said filter plates being red and the other green.

3. A device for testing the human eye comprising a holder, a yieldable retaining element mounted within the holder and provided with an opening, a transparent bi-prism mounted in said retaining element in registration with the opening therein, and a pair of transparent varicolored filter plates mounted within said holder in edge to edge relation adjacent said prism and in registration with the flat faces thereof.

VIRGIL M. SEARS.